R. F. SMITH.
DRY CELL BATTERY.
APPLICATION FILED JAN. 4, 1918.
1,267,349.
Patented May 21, 1918.
2 SHEETS—SHEET 1.
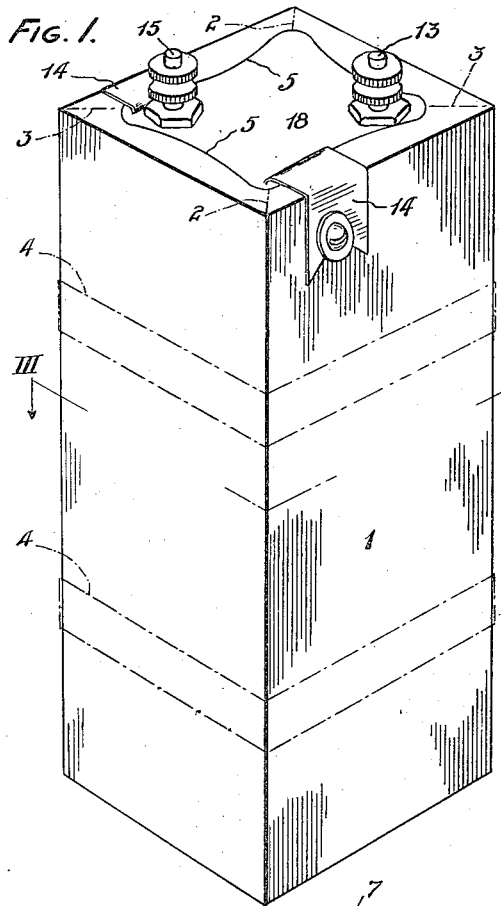
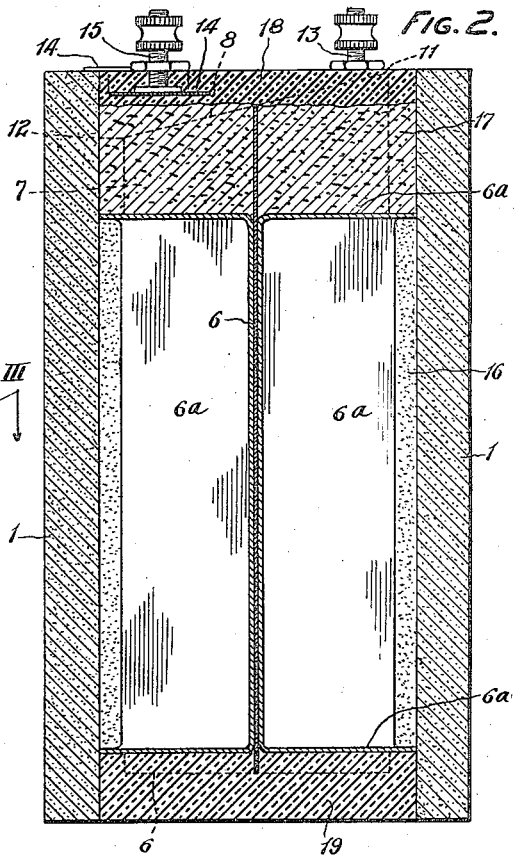
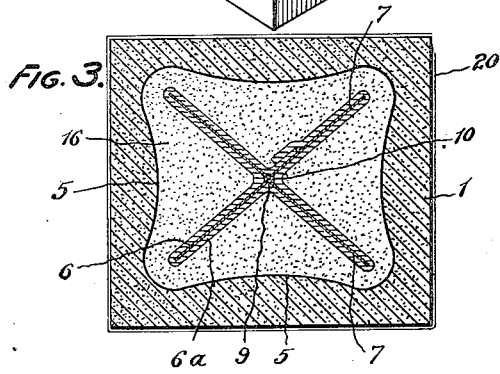
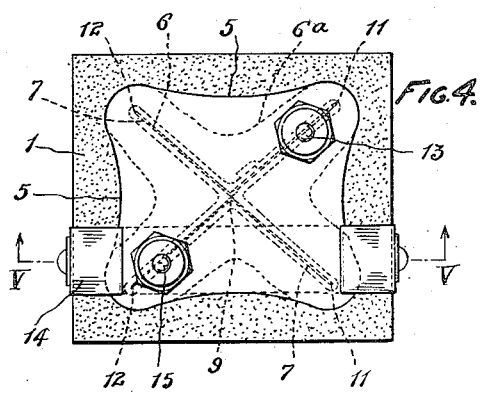
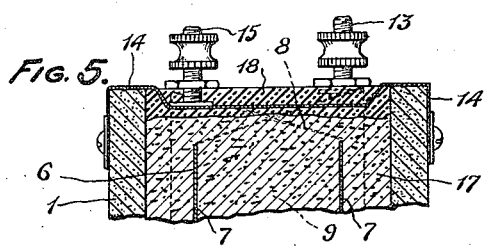
INVENTOR:
Robert F. Smith,
BY Meskel & Saywell
HIS ATTORNEYS.

R. F. SMITH.
DRY CELL BATTERY.
APPLICATION FILED JAN. 4, 1918.
1,267,349.
Patented May 21, 1918.
2 SHEETS—SHEET 2.
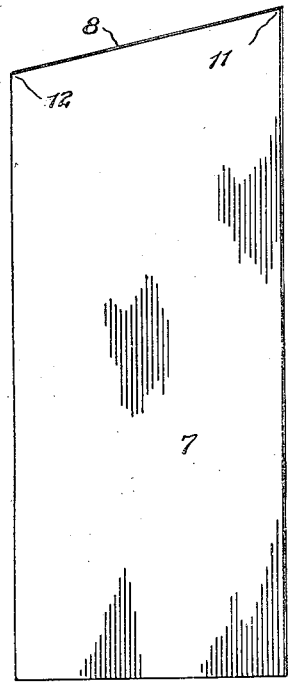
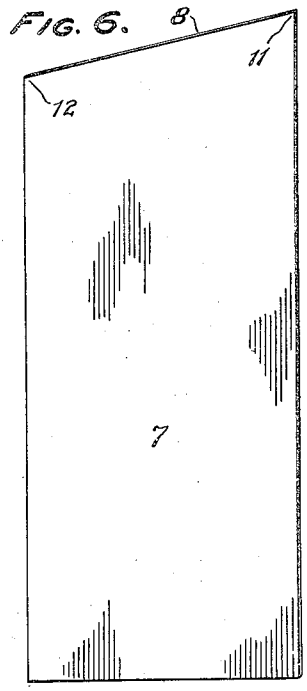
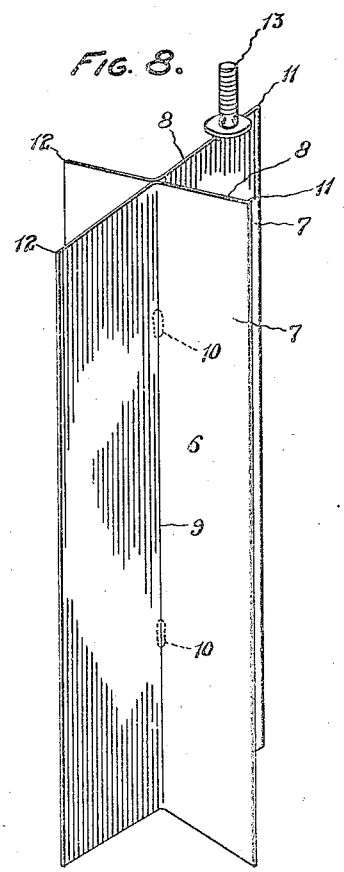
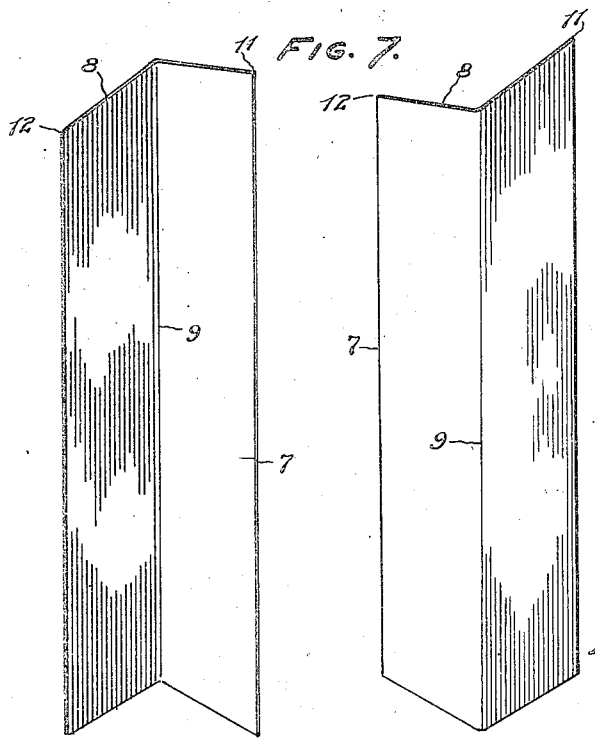

UNITED STATES PATENT OFFICE.

RALSTON F. SMITH, OF CLEVELAND, OHIO, ASSIGNOR TO THE HY-WATT BATTERY COMPANY, OF CLEVELAND, OHIO, A CORPORATION OF OHIO.

DRY-CELL BATTERY.

1,267,349.

Specification of Letters Patent.  Patented May 21, 1918.

Application filed January 4, 1918. Serial No. 210,310.

*To all whom it may concern:*

Be it known that I, RALSTON F. SMITH, a citizen of the United States, resident of Cleveland, county of Cuyahoga, and State of Ohio, have invented new and useful Improvements in Dry-Cell Batteries, of which the following is a specification, the principle of the invention being herein explained and the best mode in which I have contemplated applying that principle, so as to distinguish it from other inventions.

My invention relates to dry cell batteries, its object being to provide a dry cell battery construction which will be economical of manufacture and which will embody in the performance of its function a maximum of efficiency.

The said invention consists of means hereinafter fully described and particularly set forth in the claims.

The annexed drawings and the following description set forth in detail certain means embodying my invention, the disclosed means, however, constituting but one of various mechanical forms in which the principles of the invention may be employed.

In said annexed drawings:

Figure 1 represents a perspective view of a dry-cell battery embodying my invention.

Fig. 2 represents a vertical axial cross-section of such battery.

Fig. 3 represents a horizontal section taken upon the plane indicated by lines III—III, in Fig. 1.

Fig. 4 represents a plan of said battery.

Fig. 5 represents a fragmentary vertical section taken upon the plane indicated by a line V—V, in Fig. 4.

Fig. 6 represents a side elevation of two blanks from which the two component parts of the positive electrode are constructed.

Fig. 7 represents, in perspective, these two blanks bent into form and prior to their union to form a single electrode.

Fig. 8 represents a perspective view of the completed positive electrode.

The illustrated embodiment of my invention comprises a main outer container element 1 having a multiplicity of lateral walls whose outer lateral surfaces are flat as shown. The number of sides of this container is preferably four, as shown, and the outer contour of the cross-section is preferably rectangular, also as shown. The ends of this container, before its assembly into the completed cell, are open, and the material from which it is made is ordinary carbon composition, mainly comminuted carbon associated with a suitable binder, such as is used in this art for electrodes, the particular composition and its method of compounding being well-known to those skilled in the art. I prefer to make all of the sides integral one with the other, thereby forming an integral structure, but the container may be made of two or more separate parts, which would preferably be separated at the corners, as indicated by the dotted lines 2, 3, in Fig. 1. In this latter event, the separate parts would be held together by means of one or more suitable bands 4 of thin sheet metal such as tin plate, as will be readily understood.

These carbon walls are made of substantial thickness and their inner surfaces 5 are of convex curved form, as shown. By imparting this curved form it will be noted that a cross-section of each side is truss-like, and I am, as a consequence, enabled to use with economical advantage, the process of extrusion for forming this container element, since, as I have discovered, such truss-like form of the sides prevents the warping thereof during the drying process which is a necessary incident to the subsequent treatment of the extruded carbon material, and the deformation of the flat outer surfaces which would otherwise result is thus obviated.

This container element forms the negative electrode of the cell. Within the latter is a second and positive electrode 6, Fig. 8. This latter electrode is formed of two strips 7, 7, of zinc, these strips in their blank form being illustrated by Fig. 6. Said two strips are of the same size and dimensions and each has one end 8, its top end, inclined with reference to its sides, the latter being preferably parallel, the bottoms 19 being preferably formed at right angles with said sides. Each of these strips or plates is bent upon a median line 9, Fig. 7, in opposite directions to form two wings and the parts thus formed are joined together along this median line by means of suitable spots 10 of solder, Fig. 8. In this manner it will be noted that an electrode of cross-like cross-section is provided which has two high portions or extensions 11, 11, and two low or depressed portions 12, 12. This electrode is placed within the interior of the container element 1, as shown in Figs. 3 and 4, with the wings projecting toward the corners of the container element and with the high portions or extensions 11 extending substantially up to the plane of the top of said element, as shown in Fig. 2. A binding screw 13 is suitably secured to one of these extensions, as shown in Figs. 2 and 4. Extending across the top of said element 1 and secured to the sides thereof by means of suitable screws or in any other desired manner, is a terminal element 14 consisting of a strip of tin plate, so placed that it falls vertically opposite the two lower portions 12, 12, of the electrode 6 when the latter is in an upright position. An intermediate portion of this strip is depressed and extends downwardly into the interior of the container element, as shown in Fig. 5. It will be observed that even in this position it is well removed from the immediate vicinity of the electrode 6 and hence possibility of contact with the adjacent parts of the electrode 6 is reduced to a minimum and in fact becomes practically impossible. Secured to this intermediate and depressed portion of the terminal strip is a second binding screw 15. Before placing the electrodes 6 in the above-described position, it is provided with an outer covering 6ª of a suitable absorbent or bibulous material such as pulp board previously impregnated with a suitable material such as a flour paste which, as is well known, prevents local electrolytic action. While occupying the above-described position, a suitable electrolytic material 16 is packed into the interior of the container element and around the second electrode 6, thus fixing the latter in position. This mixture does not extend to the top as shown in Fig. 1, a considerable space being left at such top which is packed with sawdust or similar neutral and absorbent material 17. The bibulous material or pulp board also extends only up to this space. Said space receives any superfluous water which may be generated during the course of the operation of the cell and acts as a reservoir therefor, preventing leakage both physical and electrical, as will be readily understood and as is common practice.

The top of the cell is sealed with a suitable material 18 such as pitch or paraffin and this sealing material envelops the terminal strip 14 as well as the lower part of the binding screw 15, thus contributing toward the fixity and stability thereof. The bottom of the cell is likewise provided with a seal 19 of pitch or the like.

The parts having been assembled in the above-described manner, the entire cell is dipped into paraffin or any similar waterproof insulating material and provided with a thin outer coating 20 thereof, Fig. 3. The entire above-described structure is then preferably inserted into a suitable carton, (not shown).

By constructing a dry battery cell in the above-described manner, it will be seen that first I procure a cell having flat outer sides which permit the cells to be economically packed or a plurality thereof assembled for use in multiple or series. Furthermore, by providing the peculiar form of inner electrode and the terminal strip 14 as shown and arranged, I eliminate the necessity of securing a binding screw to a carbon element from which it might be readily broken and removed in the course of handling. By providing carbon walls of substantial thickness and of the character described, the carbon electrode itself forms the container and of itself is capable of resisting the internal strains set up in the course of packing the mixture, without deforming the exterior contour of the cell, thus contributing materially to the simplicity and hence economy of construction. Furthermore, by providing the cross-like cross-section for the electrode 6 and by placing same in the cell as shown in Fig. 3, I am enabled to further utilize the convexity of the interior surfaces 5 for the production of increased economy, since it will be seen that this convexity permits the carbon electrode to project nearer to and thereby shorten the path of resistance between the two electrodes.

By providing the exterior of the carbon container element with a coating of paraffin an effective insulator against local electrolytic action as a result of the inadvertent application of an electrolytic element such as water, is obtained.

Having fully described my invention, what I claim and desire to secure by Letters Patent is:

1. In a dry-cell battery, the combination of a container element formed of carbon material and forming the negative electrode, such carbon material constituting the sides only of such container; a positive electrode within said container; an electrolytic mixture interposed between said electrodes; and suitable insulating closures for the ends of said element.

2. A container element for dry-cell batteries, consisting of a multiplicity of lateral walls each having a flat exterior surface and an interior curved surface whereby a cross-section is produced having greater depth in the middle than at the ends.

3. In a dry-cell battery, the combination of a container element formed of extruded carbon material and forming the negative electrode, such carbon material constituting the sides only of such container; a positive electrode within said container; an electrolytic mixture interposed between said electrodes; and suitable insulating closures for the ends of said element.

4. In a dry-cell battery, the combination of a container element formed of carbon material and forming the negative electrode, such carbon material constituting the sides only of such container; a positive electrode within said container; an absorbent sheet surrounding said positive electrode; and an electrolytic mixture interposed between said electrodes; said absorbent sheet being bent over and upon the electrolytic mixture so as to cover the ends of the body of such mixture; and suitable closures, including insulating material, for the ends of said container.

5. A dry-cell battery element consisting of a body of extruded carbon material forming a container and open at both ends.

6. A dry-cell battery element consisting of a body of extruded carbon material forming a container having sides integral with each other and open at both ends.

7. A dry-cell battery including in its structure a container element of carbon having a multiplicity of sides each of which is flat and forming an interior space having rectangularly related adjacent surfaces; an electrode in said space formed with a plurality of wings or vanes respectively projecting toward the angles formed by such adjacent surfaces.

8. A container element for dry-cell batteries, consisting of a multiplicity of lateral walls each having a flat exterior surface and an interior curved convex surface.

9. A container element for dry-cell batteries consisting of a multiplicity of lateral walls each having a flat exterior surface, each such wall consisting of extruded material composed mainly of carbon and a suitable binder.

10. A container element for dry-cell batteries, consisting of a multiplicity of lateral walls integral with each other and composed of extruded material mainly consisting of carbon and a suitable binder.

11. A container element for dry-cell batteries, consisting of a multiplicity of lateral walls each having a flat exterior surface and of irregular cross-section.

12. A dry-cell battery including in its structure a container element of carbon having a multiplicity of sides each of which is flat and forming an interior space having rectangularly related adjacent surfaces; an electrode in said space formed with a plurality of wings or vanes respectively projecting toward the angles formed by said sides; said sides being of irregular cross-section.

13. In a dry-cell battery, the combination of a container element composed of carbon and forming one of the electrodes; a second electrode within said container element; a suitable electrolytic material surrounding said second electrode; and a terminal strip across one end of said element and secured thereto, an intermediate portion of said strip being depressed within the interior of said container element; and a binding screw secured to said intermediate portion of strip.

14. In a dry-cell battery, the combination of a hollow container element forming one of the electrodes; a second electrode within said container element and a suitable electrolytic material surrounding said second electrode; the latter having a portion elevated above the opposite upper portion thereof; and a binding screw secured to said elevated portion.

15. In a dry-cell battery, the combination of a hollow container element forming one of the electrodes; a second electrode within said container element and a suitable electrolytic material surrounding said second electrode, the latter having a portion elevated above the upper opposite portion thereof; a binding screw secured to said elevated portion; and a terminal member secured to said container element and being located in juxtaposition to the depressed portion of said second electrode; and a binding screw secured to said terminal member.

16. A dry-cell battery comprising an outer container member forming one of the electrodes; a second electrode within said outer container; a suitable electrolytic mixture surrounding said electrode; and two terminal members including binding screws connected with said two electrodes respectively, said binding screws being located opposite the interior space of the container member whereby they are removed a material distance from the outer edge thereof.

17. A dry-cell battery electrode of crosslike cross-section, the wings of said electrode having varying outer longitudinal dimensions.

18. An electrode for dry-cell batteries comprising two pieces of metal each bent upon a longitudinal median line and secured to each other along such line, one edge of each of said pieces of metal being inclined with reference to said line.

19. In a dry-cell battery, the combination of an external container element composed of carbon forming a receptacle and also forming one of the electrodes of the battery; a terminal strip across one end of said element and secured thereto; an intermediate portion of said strip being depressed within the interior of said container element; and a sealing material filling one end of said container and having said depressed portion of the strip embedded therein.

Signed by me, this 2nd day of January, 1918.

RALSTON F. SMITH.